March 6, 1962
F. H. MacARTHUR
3,023,699
PRINTING CYLINDER MOUNTING
Filed July 6, 1959
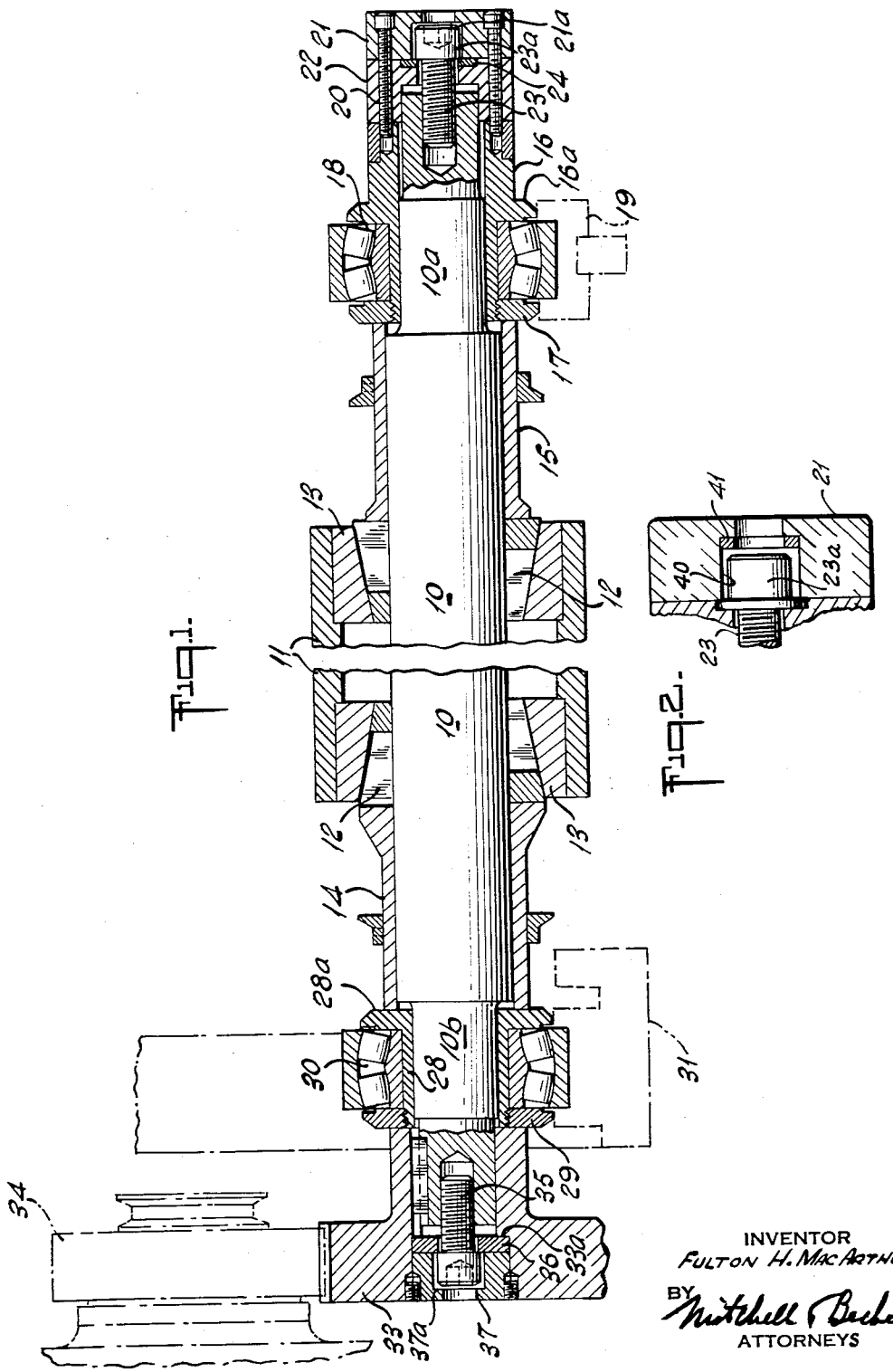
INVENTOR
FULTON H. MacARTHUR
BY Mitchell Bechert
ATTORNEYS United States Patent Office 3,023,699
Patented Mar. 6, 1962

3,023,699
PRINTING CYLINDER MOUNTING
Fulton H. MacArthur, Glen Ridge, N.J., assignor to MacArthur Associates, Inc., Glen Ridge, N.J., a corporation of New Jersey
Filed July 6, 1959, Ser. No. 825,071
10 Claims. (Cl. 101—375)

This invention relates to a cylinder mounting and more particularly to a printing cylinder mounting involving a print roll or printing cylinder and its shafting.

An object of the invention is to provide an improved assembly of cylinder and mounting means enabling the cylinder to be readily mounted in place on a shaft and readily dismounted.

In particular, the subject invention deals with a print roll or printing cylinder which is to be wedged in place concentrically on a shaft. For this purpose, coating wedge pieces are used between the shaft and the cylinder. Thrust in axial direction against one or more of the wedge pieces will result in binding the cylinder to the shaft for rotation therewith.

The invention provides unique thrust means on the shaft through which axial pressure may be selectively applied to the wedging means for locking the cylinder in place on the shaft. This thrust means involves threaded means accessible at an end of the shaft for turning in one direction to effect axial thrust against wedge means to lock the cylinder in place. Turning of the threaded means in the reverse direction will relieve the pressure against the wedge means and unlock the cylinder from the shaft. According to the invention, the threaded means involves a screw threaded into one end of the shaft. The head of this screw holds thrust means including anti-friction bearing means on the shaft. Tightening of the screw will result in the thrust means acting on the wedge means to lock the cylinder to the shaft. The screw may be threaded off the shaft to enable the thrust assembly, wedge means and printing cylinder to be removed from the shaft.

The invention also contemplates a pair of such screw-actuated thrust assemblies, one at each side of wedge means between the cylinder and shaft, and one of which assemblies may be backed off and the other advanced to adjust the cylinder laterally in position as well as to lock the cylinder in place.

The invention further provides a unique thrust assembly which may include a gear at one end of the shaft. This thrust assembly may include an anti-friction bearing and means threaded into an end of the shaft and accessible from that end of the shaft for turning to force the gear onto or off the shaft.

Other objects of the invention will appear from the following parts of the specification and from the drawing, wherein:

FIG. 1 is a longitudinal sectional view through a preferred embodiment of the invention; and FIG. 2 is a fragmentary sectional view of an alternative for part of the structure of FIG. 1.

In detail, 10 is the shaft for a print roll or printing cylinder 11. The print roll is clutchable or keyed to the shaft by wedge means including two symmetrical cones 12 slotted to render them flexible enough for forced contraction on the shaft. Cones 12 engage in conforming conical seats provided by ring members 13 fitted into the recessed ends of the print roll 11 for rotation therewith. Axial loading of the cones 12 for wedging them tightly into their seats in members 13 results in contraction of the cones for gripping the shaft 10 and locking the print roll to the shaft for rotation. Axial loading of the cones 12 is effected through sleeves 14 and 15 by thrust assemblies at opposite ends of the shaft 10. The right-hand assembly includes a bushing 16 on the reduced right-hand end portion 10a of the shaft. Threaded onto the inner end of the bushing is a thrust disc 17 abutting the sleeve 15. Mounted on bushing 16, between an intermediate flange 16a thereof and the disc 17 is an anti-friction bearing 18 through which the shaft may be journaled at the right on a support member 19.

Attached to the outer butt end of the bushing 16 by a plurality of shoulder screws 20 are an end member 21 and an intermediate member 22. End member 21 is formed with a pocket 21a receiving the head 23a of a cap screw 23 which is threaded into the right-hand end of the shaft 10. The intermediate member 22 has a neck portion through which the stem of screw 23 passes with clearance. Between the neck of member 22 and the end member 21 is a thrust washer 24. It is to be noted that the head 23a of screw 23 is confined between the washer 24 and the bottom of pocket 21a in the end member 21. The screw head 23a is socketed for engagement by an Allen wrench or other suitable tool invertible through an access opening in the end member 21. As shown, the screw 23 has been fully threaded into the bore in shaft 10. In this position of the screw 23, its head 23a is applying its maximum axial pressure against the right-hand cone 12 through the washer 24, member 22, bushing 16, thrust disc 17 and sleeve 15. As a result, the right-hand cone 12 is wedged tightly into its seating member 13 and is gripping the shaft 10 with sufficient force to clutch the print roll 11 to the shaft. In wedging into the right-hand seating member 13, the right-hand cone 12 applies a component of axial force to the latter member 13 and therethrough to the print roll and the left-hand member 13. Consequently, the left-hand member 13 wedges itself tightly on the left-hand cone 12 which is held against axial movement to the left by the sleeve 14 and the left-hand thrust assembly to be described. Since the two cones 12 and their seating members 13 are symmetrical, the wedging pressures and positions of the members 13 on the cones will be equalized and the print roll will be locked to the shaft in complete concentricity therewith.

When the print roll is to be replaced or is not to be driven by the shaft, then the screw 23 is backed off or turned in unthreading direction. The head 23a of the screw then acts against the bottom of the pocket 21a in end member 21 to move the end member, the member 22, bushing 16, and disc 17 to the right or outwards, so that the pressure against the sleeve 15 and the cones 12 is relieved. By threading the screw 23 completely off the shaft, the right-hand thrust assembly including elements 21, 22, 16, 17 and 18 can then be slid off the shaft, as can the print roll, the cones 12 and the sleeve 14.

The left-hand thrust assembly includes a flanged bushing 28 on the reduced left end portion 10b of the shaft 10. The flange 28a of the bushing 28 abuts the left end of sleeve 14. A disc 29 is threaded onto the left end of the bushing 28. Between disc 29 and flange 28a, the bushing 28 carries an anti-friction bearing 30 by which the shaft 10 may be journaled on its left in support means 31. Keyed onto the extreme left end portion of the shaft 10 is a gear 33 adapted to be worked with a drive gear 34 for rotating the shaft. The gear 33 is held onto the shaft 10 by means including a cap screw 35 threaded into the left end of the shaft. Between the head of the screw 35 and an annular shoulder 33a formed between the shaft-receiving bore in the gear 33 and the enlarged outer bore of the gear hub is a thrust washer 36. The head of the screw 35 is socketed to receive an Allen wrench or like tool, access being had through an opening in the closure ring 37 fastened to the gear 33. The ring 37 has a pocket 37a receiving the head of screw 35. When the screw 35 is turned in a direction to unthread it from the shaft 10, the head of the screw presses against the bottom of the pocket 37a so as to force the gear 33 off the shaft. Thus, the arrangement of screw 35, disc 36 and ring 37 provides means whereby the gear 33 may be removed from the shaft merely by turning the screw in the proper direction. Likewise, the arrangement provides convenient and unique means for forcing the gear 33 into place on the left end of the shaft 10.

Elements 40 are ink splash guards shielding the bearings 18 and 30 from ink thrown off the printing roll.

In use, and to replace the printing cylinder, the end adjustment screws 23—35 are backed off from their secured positions. This results in forced removal of the right-hand bearing assembly and of the drive gear at the left, as well as relieving the wedge-action supporting forces on the printing cylinder. In certain cases, the printing cylinder can be removed without removing its shaft, but I generally prefer to remove the entire shaft and cylinder assembly, through the access opening in the right-hand end frame of the press, shown in phantom outline in the drawing.

It will be understood that the individual thread directions for screws 23—35 will depend upon the ultimate rotational direction for the printing cylinder 11, the direction being such as to produce self-tightening upon cylinder rotation. Thus, for cylinder rotation in the clockwise sense, as viewed from the left side of FIG. 1, the screw 35 will preferably have a left-handed thread, and the screw 23 will preferably have a right-handed thread.

In FIG. 2, there is illustrated a slight modification wherein the counter bore 40 (of end member 21) which receives the head 23a of screw 23, also receives a hardened steel wear plate or washer 41, thus assuring against undue wear of end member 21 for repeated removal of the printing cylinder. In both FIGS. 1 and 2, the washer 24 will be understood to be of hardened material for the wear-resistant purposes indicated.

It will be seen that I have provided an improved printing cylinder assembly and mounting, avoiding deficiencies of prior arrangements and rendering printing-cylinder replacement a simple task, involving primarily only external end access with a simple Allen or the like wrence. In setting up the replaced cylinder in the press, these adjustment screws 23—35 are alone relied upon to secure the bearings and gear, and to achieve fully concentric support of the printing cylinder on its shaft. Since the take-up on the cone-wedges is differential in nature (via bolts 23—35) the predominant take-up of one with respect to the other of screws 23—35 will effect any desired slight adjustment in lateral placement of the printing cylinder in the press.

While the invention has been disclosed in connection with a particular embodiment, it is to be understood that changes may be made within the scope of the invention as defined in the following claims.

What is claimed is:

1. A print roll, a shaft therefor, and lock mechanism on the shaft operable upon being subjected to axial thrust for locking the print roll and shaft together for common rotation, in combination with a thrust assembly to provide the required axial locking thrust to said mechanism, said assembly including a headed member threaded into an end of the shaft for axial movement on being turned relative to the shaft, and tubular means slidably carried by the shaft in interposition between the lock mechanism and the head of the headed member and having two-way abutment with the headed member to be moved positively along the shaft in either of opposite directions upon turning of the headed member in either of opposite directions, turning of the headed member in one direction producing movement of the interpositioned means in a direction to apply the required locking thrust to said mechanism and turning of the headed member in the opposite direction, producing movement of the interpositioned means in a direction to relieve the lock mechanism of locking thrust.

2. The combination with a print roll, a shaft therefor having butt ends and wedge means between the print roll and shaft operable on being subjected to requisite axial thrust for wedge-locking the print roll to the shaft, of a thrust assembly to supply the requisite axial thrust and including a headed screw threaded into a butt end of the shaft for turning relative to the shaft to produce axial travel of the headed screw, the headed screw being accessible from said end of the shaft for turning, and tubular means slidably carried by the shaft in interposition between the headed screw and the wedge means through which the headed screw upon turning of the screw in suitable direction applies the requisite axial thrust to the wedge means.

3. The invention according to claim 2, said interpositioned means slidably carried by the shaft having two-way engagement with the screw head so as to be forcibly moved along the shaft in either of opposite directions depending on the direction of turning of the screw, whereby turning of the screw in one direction acts through the interpositioned means to apply the requisite locking thrust to the wedge means while turning of the screw in the reverse direction relieves the wedge means of the locking thrust and enables movement of the print roll relative to the shaft.

4. The invention according to claim 2, said interpositioned means on the shaft including an anti-friction bearing for the shaft.

5. The invention according to claim 2, there being two such screw-actuated thrust assemblies, one at each side of the wedge means, and differentially settable by turning of their respective screws so as to effect lateral adjustment of the print roll as well as locking of the print roll to the shaft in the laterally adjusted position.

6. The invention according to claim 5, the wedge means including oppositely facing symmetrical cone-wedges and seats, adjustment of either of the thrust assemblies while the other assembly is set acting upon the adjacent cone-wedge to displace the cone-wedges and seats and therethrough displace the print roll to equalize the wedge-action forces.

7. The invention according to claim 6, each of the thrust assemblies including anti-friction bearing means for the shaft.

8. The invention according to claim 2, the interpositioned means including a gear keyed to the shaft and means providing two-way engagement between the gear and the screw head, whereby turning of the screw in one direction forces the gear off the shaft while the turning of the screw in the opposite direction forces the gear onto the shaft.

9. In combination with a tubular print roll, a shaft extending through and projecting beyond both ends of the print roll, first wedge means between the shaft and one end of the print roll, second and opposed wedge means between the shaft and the other end of the print roll, said first and second wedge means being axially slidable with respect to the shaft and being operable upon subjection to axial thrust for wedge-locking the print roll to the shaft, separate thrust assemblies at opposite ends of the shaft to supply the requisite axial thrust and including at each end a headed screw threaded into a butt-end of the shaft for turning relative to the shaft to produce axial travel of the headed screw, the headed screw being accessible from its end of the shaft for turning, and tubular means slidably carried by the shaft in interposition between the headed screw and the adjacent wedge means through which the headed screw applies the requisite axial thrust to the said adjacent wedge means upon turning of the screw in one direction, each of said headed screws being in captive engagement with its associated interpositioned means, whereby the interpositioned means may be backed away from axially thrusting engagement with its associated wedge means, so that said print roll may be selectively axially positioned with respect to the shaft depending upon the take-up of one of said headed screws and the back-off of the other.

10. The combination of claim 9 in which each of said interpositioned means supports an anti-friction bearing, whereby any and all adjustment of said headed screws may be performed axially outside the locations of bearing support of said shaft so that any surfaces between said bearings and the adjacent ends of the print roll may be smooth to avoid throwing ink and to permit ready cleaning and removal of spilled ink and the like.

References Cited in the file of this patent

UNITED STATES PATENTS

| | | |
|---|---|---|
| 123,523 | Thompson | Feb. 6, 1872 |
| 1,227,583 | Connerton | May 29, 1917 |
| 1,241,459 | Woodard | Sept. 25, 1917 |
| 1,651,295 | Shuttleworth | Nov. 29, 1927 |
| 1,759,192 | Fulk | May 20, 1930 |
| 1,802,038 | Springstead | Apr. 21, 1931 |
| 1,932,522 | Irgens | Oct. 31, 1933 |
| 2,025,746 | Horton | Dec. 31, 1935 |
| 2,583,889 | Schoonenberg | Jan. 29, 1952 |
| 2,890,517 | Mengel | June 16, 1959 |